Patented Feb. 20, 1951

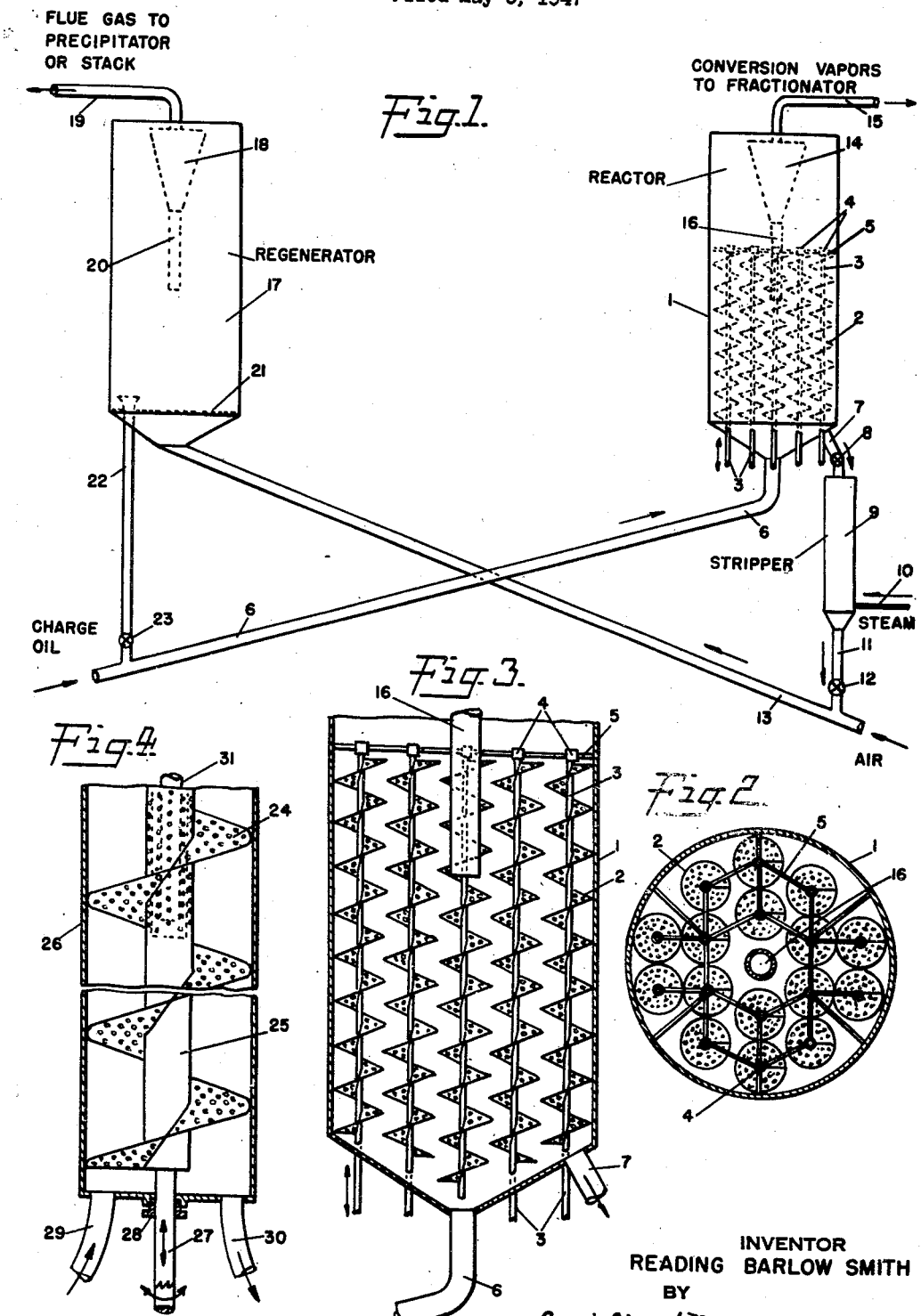

2,542,587

UNITED STATES PATENT OFFICE 2,542,587

VIBRATING MEANS FOR FLUIDIZED CATALYST REACTORS

Reading Barlow Smith, Hammond, Ind., assignor to Sinclair Refining Company, New York, N. Y., a corporation of Maine Application May 3, 1947, Serial No. 745,741

2 Claims. (Cl. 23—288)

This invention relates to the pyrolytic conversion of hydrocarbons and, more particularly, to pyrolytic conversion processes involving the use of a finely divided catalyst.

The invention is especially applicable to conversion processes of the general type wherein a finely divided catalyst, at elevated temperature, is suspended in oil vapors, passed to a reactor in which conversion of the oil occurs and in which the spent catalyst is separated from the oil vapors, the separated catalyst stripped of oil, regenerated, as by burning off coke or carbon deposited thereon, and the regenerated catalyst again suspended in the stream of oil vapors passing to the reactor. Operations of the type described are commonly designated fluid catalyst processes.

In conventional operation, the spent catalyst is withdrawn from the bottom of the reactor into a stripping column usually extending downwardly from the lower end of the reactor and in which the catalyst is contacted with steam for the purpose of removing or stripping from the catalyst vaporizable hydrocarbons remaining thereon. The stripped catalyst is withdrawn from the bottom of the stripper and is picked up by a stream of air and conveyed thereby into the bottom of the regenerator.

In fluid catalyst processes, the catalyst is maintained throughout the system in a fluidized condition. However, the catalyst is normally not of uniform density throughout the various stages of the operation. In the reaction zone, for instance, there is maintained a so-called "high density" or "dense phase" body of catalyst of considerable depth through which the hydrocarbon gases pass upwardly.

The dense phase body of catalyst in the reactor is, in conventional operation, maintained in the fluidized condition by the hydrocarbon vapors passing upwardly therethrough. Operating conditions of processes of this type have, accordingly, been limited with respect to the velocity of flow of the vapors upwardly through the bed, since it has been necessary to employ velocities sufficient to maintain the bed of catalyst in a fluidized condition. This has resulted in the use of very high reaction zones in order to provide the necessary time factor under reaction conditions.

It has been found that where superficial velocities lower than about 0.3 feet per second are employed, there is a tendency toward loss of the fluid character of the dense phase body of catalyst with a resultant channelling of the vapors upwardly through the catalyst bed with loss of uniformity of contact between the vapors and the catalyst.

My present invention provides an improved apparatus particularly adapted to the carrying out of the operation, whereby superficial velocities even as low as about .01 to 0.3 feet per second may be employed without appreciable channelling. I have discovered that the necessity of high superficial velocities through the bed may be avoided without departing from the fluidized principle of operation by maintaining the bed of catalyst in a state of mechanical vibration of a frequency within the range of about 25 to 200 cycles per second or higher. Vibrations within the range of about 50 to 100 cycles per second may be used with particular advantage.

In accordance with my present invention, the entire dense phase body of catalyst within the reactor is maintained in a fluidized state, even at extraordinarily low superficial velocities of the vapors passing upwardly therethrough, by providing in that portion of the reaction zone in which the dense phase body of catalyst is retained mechanical means for continuously and uniformly imparting rapid vibratory motion to the beds of catalyst therein.

In the case of a reaction chamber of relatively small diameter, this may be accomplished by a single helical screw extending upwardly through the chamber, of substantially the diameter of the chamber, and so perforated as to permit free passage of the catalyst and vapors therethrough.

Where a reaction zone of considerable transverse area is employed, it is desirable to use a plurality of similarly perforated helices uniformly spaced in a substantially vertical position over substantially the entire transverse area of the reaction zone.

The angle of flight of the helices is subject to considerable variation. However, a flight angle of about 30 to 50° is generally satisfactory. Instead of helices, vertical shafts provided with fins extending outwardly from the shaft in a plane forming a substantial angle with the vertical may be employed. If such fins are of substantial area, they should be perforated so as to permit free flow of the catalyst and vapors through the chamber.

The present invention provides an improved apparatus adapted to continuous operation in a plurality of cooperating steps so coordinated as to constitute a unitary operation in which a charge of catalyst is repeatedly used and intermittently regenerated and returned to the reaction zone and which is adapted to a particularly wide range of vapor velocities through the reaction zone.

The invention is applicable generally to fluid catalyst conversion processes but will be described and illustrated herein as applied to a conventional fluid catalyst cracking operation with reference to the accompanying drawings of which:

Figure 1 represents, conventionally and diagrammatically, a flow diagram of the operation;

Figure 2 is a cross-sectional view of the reactor shown in Fig. 1;

Figure 3 is an elevational view of the reactor of Figs. 1 and 2; and

Figure 4 is a fragmentary view of a reactor of relatively small transverse area in which a single helix is employed.

Referring more particularly to that embodiment of my invention shown in Figs. 1, 2, and 3 of the drawings, the apparatus indicated by the reference numeral 1, represents a generally cylindrical reactor provided with a plurality of perforated helices 2 extending vertically upwardly through the reactor and substantially uniformly positioned throughout the transverse area thereof. The helices are supported by shafts 3 which, in turn, are supported at their upper ends by bearings 4 in which the shaft is free to move vertically. The bearings 4 are supported by spider-construction 5 positioned in the reactor at a point preferably above the upper surface of the dense phase bed of catalyst.

The shafts extend downwardly through the lower end of the reaction chamber to conventional vibrating devices, not shown in the drawings. The vibrating device may, for instance, be actuated either mechanically or electrically, to impart vertical vibratory motion to the shafts, an eccentric, for instance. In addition to the vibratory motion, the shafts and helices supported thereby may, with advantage, be slowly rotated in either direction, preferably in the direction tending to convey the catalyst upwardly.

The finely divided catalyst suspended in oil vapors enters the reactor through conduit 6 and is carried upwardly through the reactor primarily by the rising stream of vapors. There is a tendency for the catalyst to drop out of suspension forming the so-called "dense phase" body of catalyst in the reactor in contact with the helices. Spent catalyst is withdrawn from the lower portion of the body of catalyst through conduit 7, the flow being controlled and regulated by valve 8, into the upper portion of the stripper 9. In passing downwardly through the stripper, the catalyst is intimately contacted with steam or other gaseous stripping medium introduced into the lower end of the stripper through line 10. Catalyst flows from the lower end of the stripper through conduit 11, the rate of flow being controlled by valve 12, into conduit 13.

Steam, together with hydrocarbons stripped from the catalyst, passes from the stripper into the lower end of the reactor through conduit 7 and passes upwardly therethrough, together with the hydrocarbon vapors, introduced through conduit 6, and the admixed vapors pass from the upper end of the reactor through cyclone type separator 14 for the separation of suspended catalyst, the vapors passing off through conduit 15 to fractionator, not shown in the drawings, and the separated catalyst being returned to the dense phase body of catalyst in the reactor through return pipe 16.

In conduit 13, the spent catalyst is caught up by a stream of air, or other oxidizing gas, introduced into the lower end of the conduit, and carried upwardly into the regenerator 17 wherein carbon or coke, and heavier hydrocarbons deposited thereon is burned off by contact with the air. Flue gases pass from the upper portion of the regenerator through cyclone separator 18 and out through conduit 19 to a precipitator, or stack, not shown, and the separated catalyst is returned to the body of catalyst in the regenerator through return line 20.

Regenerated catalyst is withdrawn from the lower portion of the regenerator, above the grid 21, through regenerated catalyst leg 22, provided with valve 23 for controlling the flow of catalyst therethrough, into the lower end of conduit 6 where it is caught up by vaporized charge oil introduced into the lower end of the conduit and returned thereby to the reactor.

As previously noted, where a reactor of relatively small transverse area is employed, the dense phase body of catalyst therein may be kept in a state of continuous vibrations by a single helix, as shown more particularly in Figure 4 of the drawing. As there shown, the single helix 24 is supported by the perforated cylinder 25 extending centrally through the vertically elongated reaction chamber 26, the cylinder, in turn, being rigidly supported by shaft 27 extending through the bottom of the chamber through a suitable packing gland 28, of conventional type, to a vibrating mechanism, not shown, but indicated in the drawings to be adapted to impart vertical vibratory motion to the shaft and also to rotate the shaft through which the vibratory and rotating motion is imparted to the helix. In this fragmentary view, Figure 4, the catalyst suspended in oil vapors is introduced to the reaction chamber through conduit 29 and spent catalyst is withdrawn therefrom for stripping and regeneration through conduit 30.

That cylindrical support for the helix extending upwardly through the reaction chamber is shown as perforated and the catalyst fines separated from the effluent gases are returned to the body of catalyst through returned line 31 to the space within the perforated cylinder and find their way into the main body of catalyst. The flights of the helix are also perforated so as to permit free flow of the catalyst and of the hydrocarbon vapors through the reaction chamber.

Instead of introducing the catalyst in suspension in gaseous media into the lower ends of the reaction and regenerating chambers, as shown, the catalyst may be separately introduced at an upper portion of either or both of the chambers and flow downwardly therethrough counter to the rising gaseous medium.

The catalyst employed may be of the type conventionally used in fluid catalyst processes, for instance, a silica-alumina type catalyst in finely divided or powdered form. The reaction conditions may likewise be those conventionally used in operations of this type and, as understood by the art, the optimum temperatures and pressures will depend primarily upon the type of feed stock used, the particular catalyst employed, and the reaction desired.

In cracking gas oil, for instance, the reaction temperature may, with advantage, be within the range of 800° to 1,000° F. and the pressure at the top of the reactor within the range of about 5 to 25 pounds per square inch. The reaction temperature may be within the range of 950° to 1,200° F., heat for the reaction being supplied largely by the hot catalyst passing to the charge oil from the regenerator.

By reason of the vibratory motion imparted to the catalyst in accordance with my present invention, lower superficial velocities may be employed in the reactor than previously permissible. Accordingly, operating conditions may be adjusted to suit the requirements of the operation without regard to velocities necessary to maintain the catalyst bed in a fluidized state. Though the invention is of particular advantage with respect to operations where low superficial vapor velocities are desired, it is also applicable to operations wherein the superficial vapor velocities are maintained within the conventional range and, when so used, results in a more uniform and thorough contact between the catalyst and the hydrocarbon vapors to be converted.

It will be understood that the present invention is not restricted to the particular embodiment thereof herein described, but is applicable to various modifications of fluid catalyst processes.

I claim:

1. Apparatus particularly adapted to the fluid catalyst conversion of hydrocarbons which comprises a vertically elongated conversion chamber adapted to contain a fluidized body of the finely divided catalyst, conduit means for introducing hydrocarbon vapors into the lower end of said chamber, conduit means for withdrawing hydrocarbon vapors from the upper end of said chamber, vertically positioned shafts uniformly spaced throughout that portion of the chamber occupied by the catalyst body, said shafts being provided with fins extending outwardly from the respective shafts in a plane forming a substantial angle with the vertical and mechanical means for imparting rapid, vibratory motion to the respective shafts.

2. Apparatus particularly adapted to the fluid catalyst conversion of hydrocarbons which comprises a vertically elongated conversion chamber adapted to contain a fluidized body of the finely divided catalyst, conduit means for introducing hydrocarbon vapors into the lower end of said chamber, conduit means for withdrawing hydrocarbon vapors from the upper end of said chamber, vertically positioned helices uniformly spaced throughout that portion of the chamber occupied by the catalyst body and mechanical means for imparting rapid, vibratory motion to the respective helices.

READING BARLOW SMITH.

REFERENCES CITED

The following references are of record in the file of this patent:

UNITED STATES PATENTS

| Number | Name | Date |
|---|---|---|
| 199,742 | Primm | Jan. 29, 1878 |
| 1,944,643 | Holmes | Jan. 23, 1934 |
| 1,960,972 | Grimm et al. | May 29, 1934 |
| 2,115,056 | Wynn | Apr. 26, 1938 |
| 2,143,610 | Muller et al. | Jan. 10, 1939 |
| 2,147,603 | Hoppenstand | Feb. 14, 1939 |
| 2,161,425 | Morrison et al. | June 6, 1939 |
| 2,264,438 | Gaylor | Dec. 2, 1941 |
| 2,268,187 | Churchill | Dec. 30, 1941 |
| 2,311,984 | Guild | Feb. 23, 1943 |
| 2,360,787 | Murphree et al. | Oct. 17, 1944 |
| 2,394,651 | Alther | Feb. 12, 1946 |
| 2,419,097 | Stratford et al. | Apr. 15, 1947 |
| 2,429,751 | Gohr et al. | Oct. 28, 1947 |

FOREIGN PATENTS

| Number | Country | Date |
|---|---|---|
| 192,089 | Great Britain | Apr. 10, 1924 |
| 670,379 | Germany | Jan. 18, 1939 |
| 44,996 | Netherlands | Jan. 16, 1939 |